FIP8102 XR 4,165,487

X 455-184

United States Patent [19]

Corderman

[11] 4,165,487

[45] Aug. 21, 1979

[54] LOW POWER SYSTEM AND METHOD FOR COMMUNICATING AUDIO INFORMATION TO PATRONS HAVING PORTABLE RADIO RECEIVERS

[76] Inventor: Roy C. Corderman, 9209 Long Hills Dr., Sun City, Ariz. 85351

[21] Appl. No.: 895,005

[22] Filed: Apr. 10, 1978

[51] Int. Cl.[2] .................... H04B 1/00

[52] U.S. Cl. .................... 325/54; 325/133; 325/308; 343/745; 179/1 AT

[58] Field of Search .................... 325/31, 53, 54, 133, 325/308, 363, 365, 178–180; 333/84 L; 343/719, 739, 740, 745; 179/82, 1 B, 1 AT, 1 DD

[56] References Cited

U.S. PATENT DOCUMENTS

| | | | |
|---|---|---|---|
| 2,567,431 | 9/1951 | Halstead | 325/308 |
| 2,980,793 | 4/1961 | Daniel | 325/178 |
| 3,107,330 | 10/1963 | Hausen | 325/363 |
| 3,235,804 | 2/1966 | McIntosh | 325/308 |
| 3,585,505 | 6/1971 | Ogilvy | 179/82 |
| 3,660,762 | 5/1972 | Smith | 325/178 |

OTHER PUBLICATIONS

Terman, et al., "Electronic and Radio Engineering," 1955; p. 935.

Stoner and Earnshaw, "The Transistor Radio Handbook," 1963; pp. 69–70.

Norris, "Radio Engineering," 1952, pp. 127–128.

*Primary Examiner*—Robert L. Richardson
*Assistant Examiner*—Alexander Gerasimow
*Attorney, Agent, or Firm*—Cahill, Sutton & Thomas

[57] ABSTRACT

Low power apparatus and method for tuning portable receivers of patrons of an establishment (such as an auditorium) to a predetermined frequency and communicating audio frequency information to the patrons via the portable receivers. An audio signal is derived from an audio frequency public address sound system and inputted to a modulator to modulate a radio frequency carrier signal. The modulated carrier signal is amplified and transmitted by means of a loop antenna surrounding the region of the establishment wherein the patrons and their portable receivers are situated. A very low power modulated radio frequency signal is derived from a transmitter including a modulator and an amplifier and is inputted to a receiver tuning aid circuit positioned near the entrance of the establishment. The tuning aid circuit drives a small ferrite core antenna which radiates a signal which enables the patrons to easily tune their portable receivers to the carrier signal frequency by positioning the receivers close to the ferrite core antenna and tuning the receivers for the loudest audio signal.

13 Claims, 7 Drawing Figures

LOW POWER SYSTEM AND METHOD FOR COMMUNICATING AUDIO INFORMATION TO PATRONS HAVING PORTABLE RADIO RECEIVERS

BACKGROUND OF THE INVENTION

The invention relates to low power systems and methods for communicating audio frequency sound information to persons having portable receivers in an establishment.

Many rather large establishments, such as auditoriums, museums, churches, theaters, and the like utilize public address sound systems to permit a program, such as a lecture, music, sermon, etc. to be communicated to patrons within the establishment. Such large establishments usually have acoustical characteristics which result in "dead spots" and reverberations which interfere with hearing of the program by certain patrons. Various noises within the establishment emanating from other patrons or activities within the establishment also interfere with hearing of the program by certain patrons, especially patrons who are hard of hearing. The above-described circumstances present difficulties both for hard-of-hearing patrons and for their hosts. Frequently, the host provides special seating for hard-of-hearing patrons. Certain prior systems have included special seats with "wired in" receiving units including headsets or the like in order to enable hard-of-hearing patrons to clearly hear the program. However, necessity of providing special seating and/or sound equipment for hard-of-hearing patrons is inconvenient and expensive, and largely eliminates the choice of seating within the establishment that hard-of-hearing patrons would usually prefer.

Prior attempts to solve the above-described problems have involved "wired in" sound units or costly, specialized receivers for detecting electromagnetic signals containing the program information. One prior system utilizes specialized expensive audio frequency receivers capable of detecting audio frequency electromagnetic radiation containing the program information.

SUMMARY OF THE INVENTION

Accordingly, it is an object of the invention to provide an inexpensive and convenient system and method for communicating audio frequency sound information to patrons having inexpensive portable receiving units.

It is another object of the invention to provide an inexpensive and convenient method and low powered system for communicating program information to patrons, which system and method meets federal regulations.

It is another object of the invention to provide a low power method and system for communicating program information to patrons without the need for "wired in" receiving units.

It is another object of the invention to provide an inexpensive low power system and method for communicating program information to hard-of-hearing patrons of an establishment.

It is another object of the invention to provide a low power system and method for communicating program information to hard-of-hearing patrons in an establishment having an audio frequency public address sound system.

Briefly described, and in accordance with one embodiment thereof, the invention includes a system and method for communicating audio information to patrons of an establishment. Each of the patrons has an AM broadcast portable radio receiver. In a preferred embodiment of the invention, the radio receiver is a conventional low cost receiver capable of receiving AM broadcast band amplitude modulated radio frequency signals. An oscillator produces a radio frequency carrier signal. Audio frequency electrical signals are tapped from a speaker wire of a public address sound system. The audio frequency signals and the radio frequency carrier signal are inputted to a modulator which produces an amplitude modulated carrier signal, which has been amplified and utilized to drive a strip antenna or a loop antenna wherein the patrons and their portable radio receivers are located. In one embodiment of the invention a low power replica of the amplitude modulated radio frequency carrier signal is derived from the circuitry producing the amplitude modulated radio frequency signal and is utilized to drive a small ferrite core antenna located near the entrance of the establishment to permit patrons to easily tune their portable receivers to the proper frequency by holding the portable receiver close to the ferrite core antenna and tuning for the loudest sound. If no program information is yet available to modulate the radio frequency carrier signal, an audio frequency electrical signal source is activated by a switch and utilized to modulate the derived low power radio frequency carrier signal to cause the portable radio receivers to produce an audio sound to enable the patrons to tune their portable receivers to the proper radio frequency carrier frequency.

DESCRIPTION OF THE INVENTION

Figures 1, 2:
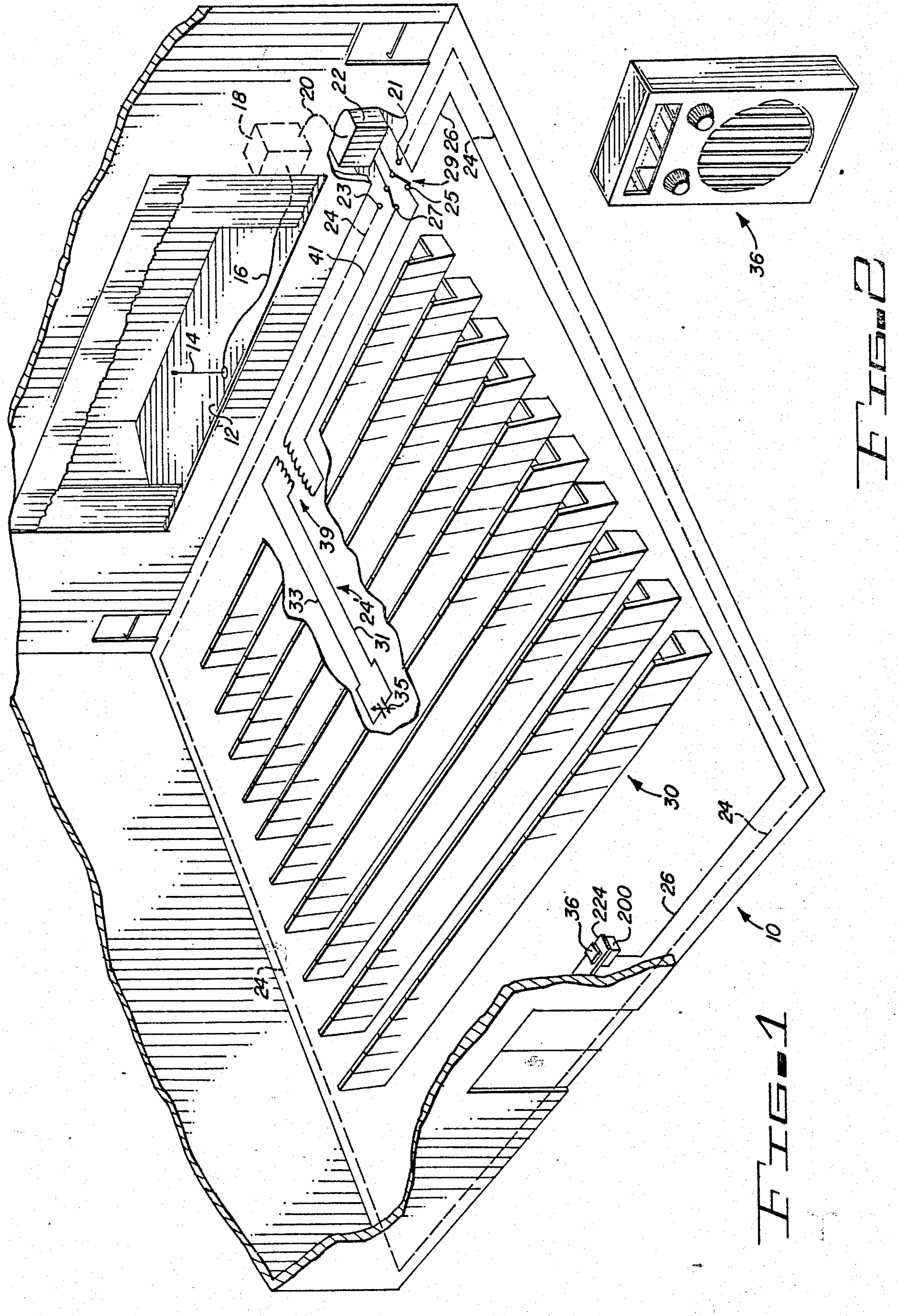
FIG. 1 is a perspective cutaway view of an auditorium having a public address system, wherein the method and apparatus of the present invention are utilized to communicate audio frequency program information to hard-of-hearing patrons having portable radio receivers.
FIG. 2 is a perspective view of a typical inexpensive portable receiver utilized by a patron in accordance with the system and method of the invention.
Figure 6:
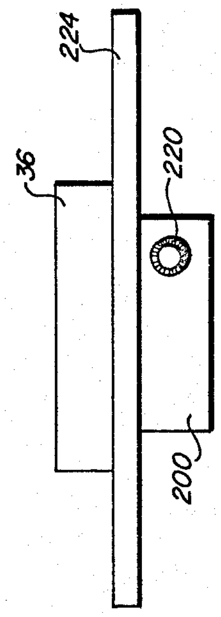
FIG. 6 is a side view of a shelf positioned near the entrance of the auditorium of FIG. 1 having the tuning aid circuit of FIG. 5 mounted thereon and having a portable receiver placed thereon to assist tuning of the receiver to the proper carrier frequency.

Referring to the drawings, and particularly to FIGS. 1, 2, and 6, an auditorium 10 includes a large chamber having a large number of seats 30 therein. A stage 12 having a microphone 14 is positioned at the front of the auditorium in the usual manner. A cable 16 extends from microphone 14 to electronic system 18 for a public address sound system which amplifies the audio frequency information received by means of microphone 14 and drives speakers (not shown) positioned at various places within the auditorium 10.

The electronic system 22 of the present invention receives an audio signal as an input by means of cable 20, and drives a loop antenna 24 which encircles seats 30. The dotted line representing the loop antenna is located beneath the carpet or beneath the floor of auditorium 10.

An alternate (and presently preferred) strip antenna system 24' located under a rectangular group of seats, is shown in FIG. 1, coupled to the output of electronic system 22 by means of switches 29 and coax cable 41. Switch 29 then also disconnects loop antenna 24 from the output of electronic system 22. Strip antenna system 24' includes: (1) transformer 39, (2) a length (which can, for example, be approximately fifty feet) of 300 ohm strip transmission line of the type commonly used for television lead in wires, including two closely spaced (approximately ½ inch) parallel conductors 31 and 33, and (3) a terminating tuning capacitor 35.

Strip antenna system 24' can be used if it is desired to provide signals to AM portable radios held by patrons in a limited group of seats. Strip antenna system 24' limits the extent of radiation much more than loop antenna 24, yet produces signals adequate for good reception by portable receivers located within approximately ten to fifty feet of the conductors 31 and 33. Multiple strips can be used in conjunction with multiple amplifiers, respectively, of the type shown in FIG. 4, all of which can be driven by a single circuit of the type shown in FIG. 3. It has been found that much more radiation is produced if capacitor 35 is used to terminate conductors 31 and 33 than if they are shorted together, probably because of the phase difference of the signals at the ends of conductors 31 and 33 if they are not shorted at that point. Capacitor 35 can be varied to tune the strip antenna to resonate at the predetermined operating frequency. It has been found that wider spacing of the strip conductors increases the widths of the field service area. For example, if the strip conductors 31 and 33 are spaced four inches apart, the width of the field service area is fifty feet on each side of the strip antenna. In one embodiment of the invention, two strip antennas and two transmitters are used to transmit stereo signals for the program being broadcast on two different AM frequencies; in this case, each patron can carry two AM receivers, each tuned to the frequencies corresponding to the two stereo channels, respectively.

Electronic system 22 includes an AM broadcast frequency signal modulated by the audio information received from cable 20 and transmits it on an available radio frequency carrier frequency in the range from 550 kilocycles to 1640 kilocycles, the well known amplitude modulated radio frequency broadcast band established by FCC regulations. The power supplied to antenna 24 or 24' by electronic system 22 is less than 100 milliwatts, as required by FCC regulations.

Patrons who are hard-of-hearing carry AM (amplitude modulation) portable receivers with them into auditorium 10. FIG. 2 illustrates a typical inexpensive AM receiver 36 which would be suitable. A patron carrying receiver 36 into auditorium 10 passes by a shelf or counter 224 and places receiver 36 on a designated area or shelf 224. Beneath shelf 224 is positioned a tuning aid circuit 200, connected by means of cable 26 to electronic system 22. Tuning aid circuit 200 drives a small antenna which produces an amplitude modulated signal, enabling the patron to quickly tune receiver 36 to the frequency at which the program will be broadcast from the microphone (or other audio signal source, such as a tape recorder, etc.) on stage 12; he simply tunes the receiver for maximum sound. The patron then makes his way to one of seats 30. He can then adjust the volume of receiver 36 to suit himself, as he listens to the entire program. His enjoyment of the program will be unaffected by variations in the acoustical properties of auditorium 10 and also will be relatively unaffected by noises produced by other activity within auditorium 10, regardless which seat the patron selects. His use of receiver 36 is unlikely to disturb other patrons who do not use receivers, as the sound from receiver 36 blends with sounds produced by the speakers of the public address sound system.

Figure 3:
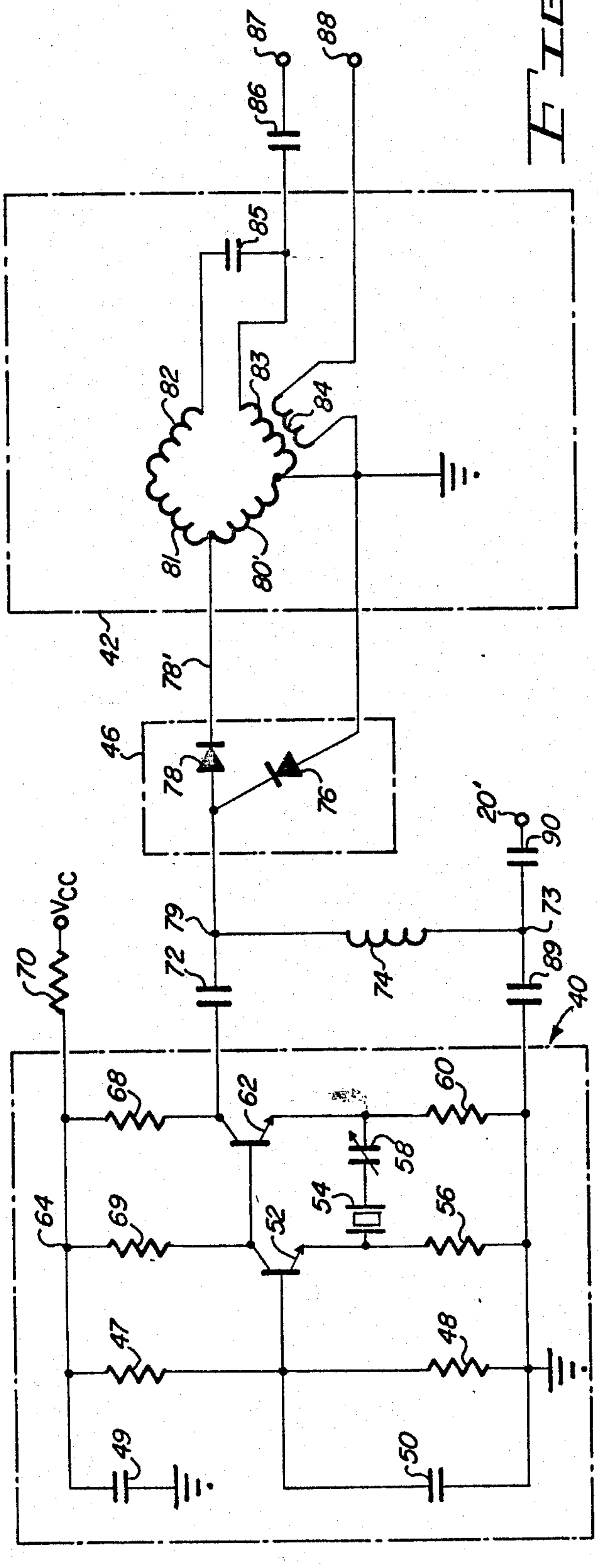
FIG. 3 is a schematic circuit diagram of an oscillator, modulator, and modulator output circuit of a transmitter used in accordance with the system and method of the invention.

Referring now to FIG. 3, the circuitry shown includes oscillator 40, modulator 46, and tuned output circuit 42. Oscillator 40 includes transistors 52 and 62. Transistor 52 has its collector coupled to node 64 by resistor 69 and its emitter coupled to ground by resistor 56. The base of transistor 52 is biased by resistors 47 and 48. Capacitors 49 and 50 couple the AC signal components of node 64 and the base of transistor 52, respectively, to ground. The collector of transistor 52 is connected to the base of transistor 62. The emitter of transistor 52 is also coupled by means of quartz crystal 54 to one terminal of variable capacitor 58.

The other terminal of variable capacitor 58 is connected to the emitter of transistor 62, which is also coupled to ground by resistor 60. Variable capacitor 58 may be adjusted to slightly vary the frequency of the radio frequency carrier signal generated by oscillator 40. The collector of transistor 62 is coupled to node 64 by resistor 68. Node 64 is coupled to power supply voltage $V_{cc}$ by resistor 70. A radio frequency carrier signal is produced at the collector of transistor 62 and is coupled to node 79 by capacitor 72.

Modulator circuit 46 includes diodes 76 and 78 having their respective cathode and anode connected to node 79. The anode of diode 76 is connected to ground, and the cathode of diode 78 is connected to the input winding of transformer 80.

The audio frequency signal from cable 20 of FIG. 1 is applied to node 20' of FIG. 3 and is coupled to input node 79 of modulator circuit 46 by radio frequency choke 74 and capacitor 90. Consequently, the audio frequency signal applied to node 20' operates to amplitude modulate the radio frequency carrier signal produced by oscillator 40 in a well known manner based on the non-linear operating characteristics of diodes 76 and 78. The voltage produced on node 78' by modulator circuit 46 is therefore an amplitude modulated radio frequency signal.

Transformer 80 includes a ferrite toroid having an outside diameter of approximately 7/8 inches. The sides of the toroid are ¼ inch, so that each turn thereof is one inch in length. Transformer 80 has windings 80', 81, each having twelve turns, winding 83 having 24 turns and winding 84 having 10 turns. The inductance of transformer 80 and the capacitance of capacitor 85 are selected to provide a tuned circuit which oscillates at the above radio frequency carrier frequency, producing the so-called "flywheel effect", thereby providing a signal suitable as an input to a radio frequency amplifier. The signal produced by the tuned circuit 42 and coupled to node 87 by capacitor 86 is an amplitude modulated radio frequency signal which is inputted to amplifier circuit 100 of FIG. 4.

A low power winding 84 having approximately ten turns which overlap the turns of winding 83, and is utilized to derive a low power amplitude modulated radio frequency signal at node 88, which signal is inputted to the tuning aid circuit 200 of FIG. 5, subsequently described.

Figure 4:
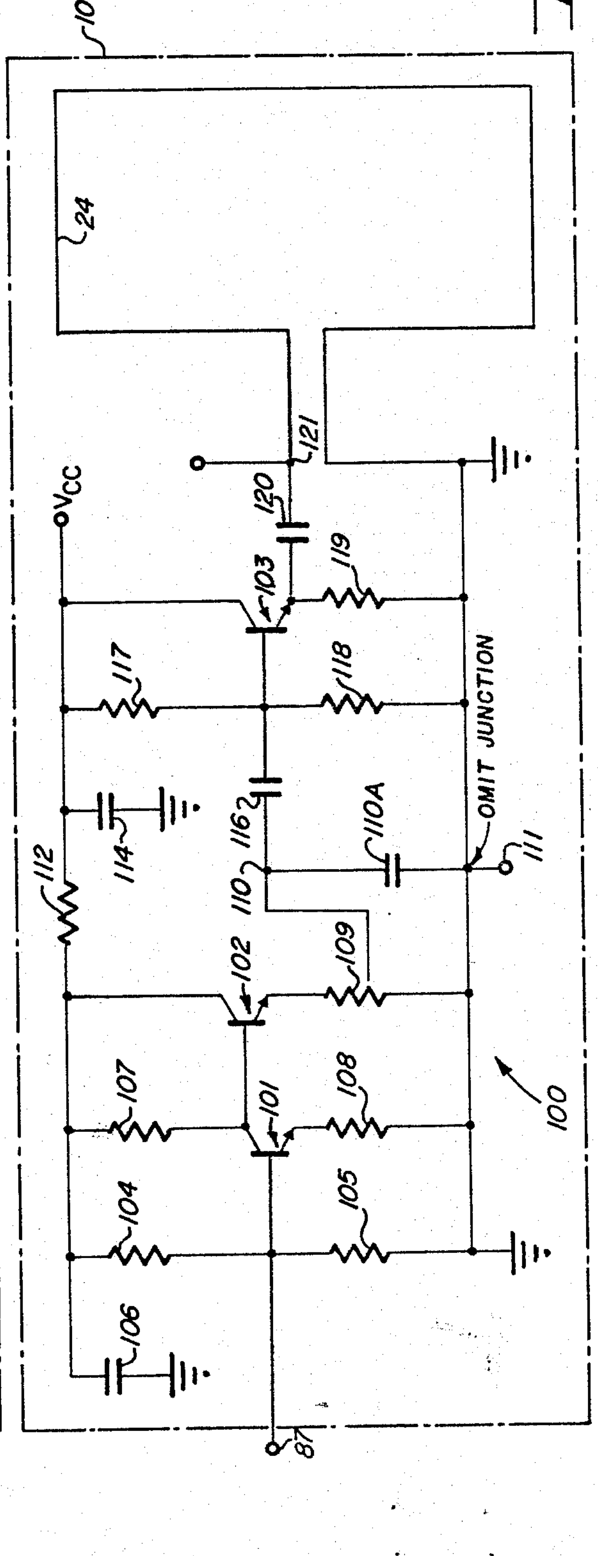
FIG. 4 is a schematic circuit diagram of an amplifier and loop antenna utilized in conjunction with the circuit of FIG. 3.

Referring now to FIG. 4, amplifier circuit 100 receives the signal on node 87 as an input. Amplifier 100 is a typical "class A" transistor amplifier circuit. Transistor 101 of amplifier circuit 100 has its collector connected to the base of transistor 102. Adjustable resistor 109 and capacitor 110A function as a gain control circuit for amplifier circuit 100. The voltage signal produced at node 110 is coupled to the base of transistor 103 by means of capacitor 116. Bias resistors 104, 105, 117, and 118 are selected to provide "class A" operation. Capacitor 120 couples the output signal of transistor amplifier 100 to strip antenna 24' or loop antenna 24, which is connected between ground and node 121.

Figure 5:
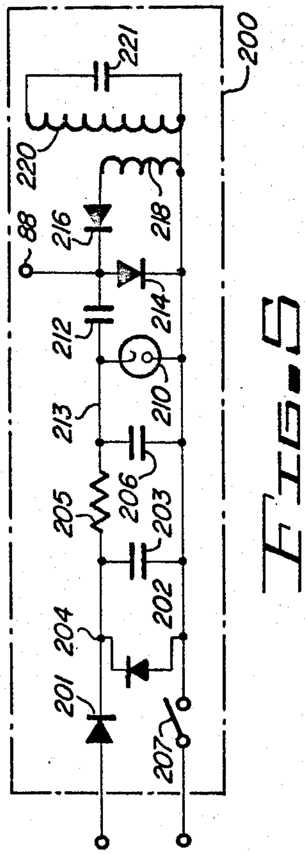
FIG. 5 is a schematic circuit diagram of a tuning aid circuit utilized in conjunction with the circuitry of FIGS. 3 and 4.

Referring now to FIG. 5, tuning aid unit 200, which was shown mounted under shelf 224 in FIG. 6 and in FIG. 1, is utilized to enable patrons to position their portable radios close (within six inches) to ferrite core antenna 220, so that the patrons can easily tune their portable radios to the frequency producing the loudest audio sound, as previously explained. Ferrite core antenna 220 of tuning aid circuit 200 is several inches in length and approximately ½ inch in diameter, and is adjustable so that it operates in conjunction with capacitor 221 to resonate at the frequency established by quartz crystal 54 in FIG. 3. It is necessary that ferrite core antenna 220 be adjustable, because different quartz crystals must be used in different localities to produce different frequency radio frequency carrier signals which are not interfered with by much more powerful signals from amplitude modulated radio frequency commercial broadcasting stations in the surrounding area.

Still referring to FIG. 5, tuning aid circuit 200 includes manual switch 207, which switch connects a conventional 115 volt AC input signal to tuning aid circuit 200 if manual switch 207 is closed.

It should be noted that if the radio frequency signal on node 88 does not happen to have any amplitude modulation thereon (because no sound is being detected by microphone 14 in FIG. 1, and consequently no corresponding audio frequency electrical signal is applied to node 20' in FIG. 3), then no audio signal component will be detected by portable receiver 36 as a patron attempts to tune it. If this situation exists, manual switch 207 should be closed, causing an oscillator including glow tube 210, capacitor 206, and resistor 205 to oscillate at an audio frequency which is mixed with the radio frequency carrier signal on node 88 to produce a very low power amplitude modulated radio frequency output signal, which is radiated by ferrite core antenna 220. Then portable receiver 36 can detect the audio frequency component produced by the above glow tube oscillator in the form of an audio frequency sound, thereby enabling the patron to tune portable receiver 36 to the desired frequency at which the main program will be subsequently received, even if no audio sound is presently being inputted to the audio sound system of FIG. 1.

Circuit operation of tuning aid circuit 200 is as follows. If manual switch 207 is closed, diodes 201, 202, and capacitor 203 function as a DC rectifier and filter which produces a DC voltage across glow tube 210. (Glow tube 210 is merely a neon bulb, manufactured by General Electric Company and others and known as a glow tube.) The operation of the glow tube oscillator of tuning aid circuit 200 is as follows. The voltage through resistor 205 charges capcitor 206 to a point at which glow tube 210 "breaks down". This discharges the voltage at node 213 to a point at which the glow tube turns off. The current through resistor 205 then recharges capacitor 106 to the point at which glow tube 210 again breaks down. The values of resistor 205 and capacitor 206 are selected to produce a suitble audio frequency oscillation at node 213.

This audio signal is coupled to node 88 by capacitor 212. Diodes 214 and 216 function as a modulator which mixes the very low power radio frequency carrier signal on node 88 with the audio frequency signal generated by the above glow tube oscillator. Capacitor 221 and ferrite core antenna 220 are selected and adjusted to resonate at the desired frequency. The resulting very low power amplitude modulated radio frequency signal is radiated by ferrite core antenna 220.

The following table, TABLE 1, indicates exemplary values for the various resistors and capacitors of the circuits shown in FIGS. 3, 4 and 6 for $V_{cc}$=20 volts. Manufacturers part numbers for some of the transistors are also given in TABLE 1. Utilizing these values, the amplifier 100 of FIG. 4 will produce a voltage of approximately one volt across loop antenna 24.

TABLE 1

| Reference Numeral | Component Value or Manufacturer's Part No. |
|---|---|
| 47 | 27KΩ |
| 48 | 10KΩ |
| 49 | 1 μf |
| 50 | 1 μf |
| 52 | 2N2219 |
| 54 | 660KC |
| 56 | 6.8KΩ |
| 58 | 7-45 μμf |
| 60 | 4.7KΩ |
| 62 | 2N2219 |
| 68 | 1KΩ |
| 69 | 18KΩ |
| 70 | 1KΩ |
| 72 | .005 μf |
| 74 | 50Mh |
| 76 | 1N914 |
| 78 | 1N914 |
| 80 | 12 turns |
| 85 | .001 μf. |
| 86 | 1μf |
| 101 | 2N2219 |
| 102 | 2N2219 |
| 103 | 2N2219 |
| 104 | 8.7KΩ |
| 105 | 1KΩ |
| 106 | 1 μf |
| 107 | 1KΩ |
| 108 | 100Ω |
| 109 | 1KΩ (Variable) |
| 112 | 1.8KΩ |
| 114 | 100 μf |
| 116 | 1 μf |
| 117 | 4.7KΩ |
| 118 | 4.7KΩ |
| 119 | 200Ω |
| 120 | 1 μf. |
| Vcc | 20V |
| 203 | 10 μf |
| 212 | 20 μf |
| 218 & 220 | Miller #6300 |
| 301 | 25KΩ (Variable) |
| 303 | 25KΩ (Variable) |

TABLE 1-continued

| Reference Numeral | Component Value or Manufacturer's Part No. |
|---|---|
| 308 | 1 μf |
| 312 | 51KΩ |
| 313 | 4.7KΩ |
| 314 | 2N2219 |
| 315 | 1KΩ |
| 316 | 100Ω |
| 318 | 1 μf |
| 320 | 1N3666 |
| 322 | 1N3666 |
| 324 | .005 μf |
| 332 | 2.7K Ω |
| 334 | 50Mh |
| 336 | 20μf |
| 338 | 1N3666 |
| 340 | 1N3666 |

Figure 7:
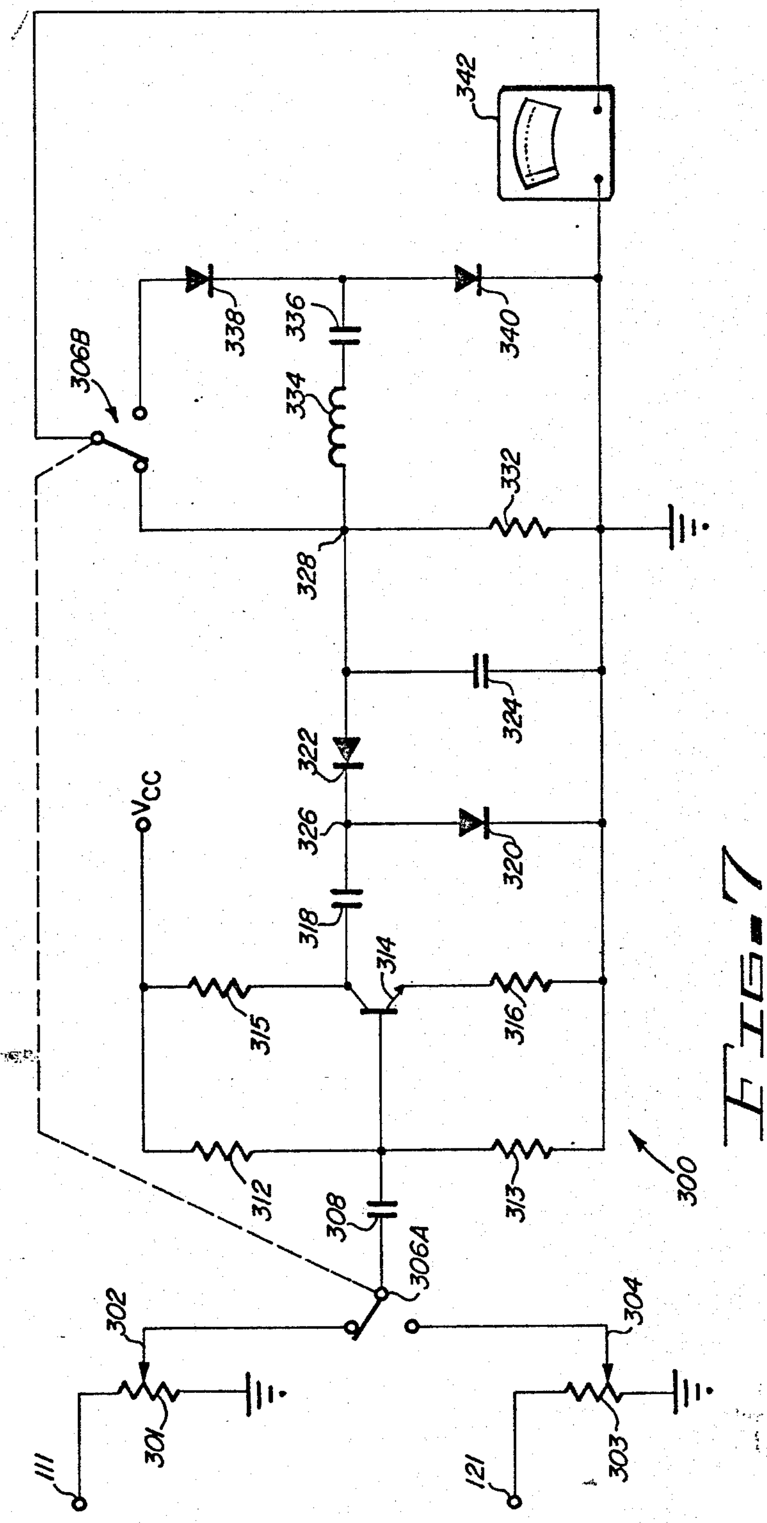
FIG. 7 is a schematic diagram of a tester for testing the operation of the system of the invention.

Referring now to FIG. 7, a test circuit 300 for conveniently testing both the audio frequency and radio frequency performance of the circuitry of FIGS. 3 and 4 receives the signals produced at nodes 121 and 111 of FIG. 4. The signal at node 121 is the amplitude modulated radio frequency signal applied to antenna 24. The signal at node 111 represents the radio frequency signal of node 87 of the amplifier circuit of FIG. 4. Test circuit 300 includes an input circuit including transistor 314 and resistors 312, 313, 315, and 316. This input circuit is a conventional transistor amplifier having its output coupled to node 326 by capacitor 318. Diodes 320, 322 and resistor 332 function as a demodulator circuit, which produces a DC signal representative of the magnitude of the radio frequency component of the amplitude modulated radio frequency signal on node 326 across resistor 332. There is also an audio signal component representative of the audio component of the amplitude modulated radio frequency signal at node 326.

Test circuit 300 includes a pair of "ganged" switches 306A and 306B. With switches 306A and 306B in the first position, the signal from node 111 is coupled to the base of transistor 314 by coupling capacitor 308. DC meter 342 is connected to node 328 and thereby measures the DC voltage produced across resistor 332 of the demodulator formed by diodes 322 and 320 and resistor 332, thereby indicating the level of the radio frequency carrier produced by the transmitter including the circuit of FIGS. 3 and 4.

At node 328, there is in addition to the DC voltage previously mentioned across resistor 332, an audio frequency representing the audio component of the modulated radio frequency at the output of the amplifier transistor 103 in FIG. 4. This audio frequency passes through radio frequency choke 334 and DC blocking capacitor 336 to the junction of diodes 338 and 340. Diodes 338 and 340 acting as demodulators convert this audio frequency signal to a direct current which direct current is connected to the meter when switch 306B is in position 2.

Thus, it is seen that the tester of FIG. 7 permits easy checking of the audio frequency and radio frequency operation of the above described system merely by connecting the tester 300 to nodes 111 and 121 of amplifier 100 and switching switches 306A and 306B to positions 1 and 2 and checking to make sure that a proper level appears on DC meter 342 for each position.

I claim:

1. A system for communicating audio information to a plurality of patrons of an establishment, each of the patrons having a portable radio receiver, said system comprising in combination:

(a) means for producing a radio frequency carrier signal;

(b) means for producing audio frequency electrical signals representative of information to be communicated to the patrons;

(c) means for amplifying said audio frequency electrical signals;

(d) means for modulating the amplitude of said carrier signal by said amplified audio frequency electrical signals to produce an output signal;

(e) means for amplifying said output signal;

(f) means for transmitting said amplified output signal to said radio receivers by applying said amplified output signal to an antenna located proximately to the portion of the establishment wherein the patrons and their radio receivers are located during communication of said audio information;

(g) conductor means for conducting said output signal to a tuning location in the establishment; and (h) tuning aid means connected to said conductor means at said tuning location for radiating a low power amplitude modulated radio frequency signal of the same carrier frequency as said output signal at substantially lower field intensity then said amplified output signal to enable the patrons of the establishment to conveniently tune their portable radio receivers to said carrier frequency by holding their portable radio receivers close to said tuning aid means and adjusting the tuning controls of their portable radio receivers to obtain maximum sound levels.

2. The system of claim 1 wherein said radio frequency carrier signal producing means includes a crystal controlled oscillator resonating at a predetermined radio frequency, wherein said radio frequency is in the range from 550 to 1640 kilohertz.

3. The system of claim 2 wherein the crystal of said crystal controlled oscillator is pluggably removable, whereby the said radio frequency may be readily changed to avoid interference by local commmercial broadcast stations.

4. The system of claim 1 wherein said audio frequency signal producing means includes a public address sound system, said system further including means for conducting audio signals from said audio frequency signal producing means to a speaker of said public address sound system.

5. The system of claim 2 wherein said modulating means includes a diode modulator with a resonant transformer output stage for producing a flywheel effect amplitude modulated radio frequency signal in response to said amplitude modulating means.

6. The system of claim 5 wherein said transformer output stage includes a pluggably removable element to permit convenient changing of the resonating frequency of said resonant transformer output stage to correspond to the frequency of said carrier signal if the frequency of said carrier signal is changed.

7. The system of claim 1 wherein said antenna is a loop antenna surrounding the portion of the establishment wherein the patrons and the radio receivers are located during communication of said audio information.

8. The system of claim 1 wherein the power applied to said antenna is less than 100 milliwatts.

9. The system of claim 1 wherein said tuning aid means includes audio frequency oscillator means switchable to produce an audio frequency tone signal and further includes means responsive to said audio frequency tone signal and to said output signal for modulating said output signal to produce a radio frequency signal modulated by said audio frequency tone signal, whereby the patrons of the establishment can conveniently tune their portable receivers to the loudest sound produced by the portable audio receivers regardless of whether said audio frequency electrical signals are produced.

10. The system of claim 1 further including means for demodulating said amplified output signal to produce a direct current signal representative of the magnitude of the radio frequency carrier component of said amplified output signal to permit testing of said system by measuring said DC signal and means for demodulating the audio component of the amplified output signal to permit testing of the audio level of the system.

11. The system of claim 1 wherein said antenna is a strip antenna including first and second closely spaced conductors, said systems further including a termination capacitor connected to the extreme ends of said first and second conductors selected for increasing the amount of radiated energy from said strip antenna, said system further including transformer means for coupling said strip antenna to said output signal amplifying means.

12. A system for communicating audio information to a plurality of patrons of an establishment, each of the patrons having a portable radio receiver, said system comprising in combination:

(a) means for producing a radio frequency carrier signal;

(b) means for producing audio frequency electrical signals representative of information to be communicated to the patrons;

(c) means for amplifying said audio frequency electrical signals;

(d) means for modulating the amplitude of said carrier signal by said amplified audio frequency electrical signals to produce an output signal;

(e) means for amplifying said output signal;

(f) means for transmitting said amplified output signal to said radio receivers by applying said amplified output signal to an antenna located proximately to the portion of the establishment wherein the patrons and their radio receivers are located during communication of said audio information, wherein said antenna is a strip antenna including first and second closely spaced substantially parallel conductors disposed within the establishment a sufficient distance from any boundaries of the establishment to limit the extent of radiation from said strip antenna so that significant levels of radiation from said strip antenna are confined to the establishment, said system further including a termination capacitor connected to the extreme ends of said first and second conductors selected for increasing the amount of radiated energy from said strip antenna, said system further including transformer means for coupling said strip antenna to said output signal amplifying means, wherein the respective patrons are positioned substantially on either side of said first and second conductors of said strip antenna.

13. The system of claim 12 wherein said first and second conductors are spaced approximately one-half inch apart.

* * * * *